June 12, 1923.

N. M. ROSENDAHL 1,458,630

TRAP

Filed April 1, 1922

Inventor
Nils M. Rosendahl.
Geo. Stevens.
Attorney

Patented June 12, 1923.

1,458,630

UNITED STATES PATENT OFFICE.

NILS M. ROSENDAHL, OF DULUTH, MINNESOTA, ASSIGNOR OF ONE-HALF TO S. GEO. STEVENS, OF DULUTH, MINNESOTA.

TRAP.

Application filed April 1, 1922. Serial No. 548,745.

*To all whom it may concern:*

Be it known that I, NILS M. ROSENDAHL, a citizen of the United States, residing at Duluth, in the county of St. Louis and State of Minnesota, have invented certain new and useful Improvements in Traps, of which the following is a specification, reference being had therein to the accompanying drawing.

This invention relates to animal traps and has special reference to a modified form of the old well known pan spring trap the object thereof being to overcome many of the objectionable features of the old style trap.

Other minor advantages of the invention will appear in the further description thereof.

Referring to the accompanying drawing forming part of this application in which like reference characters indicate like parts:

1 represents the base of the trap which is rectangular in shape, composed preferably of a piece of sheet metal, bent downwardly or flanged as at 2 upon its opposite sides and at its ends bent upwardly, as at 3 and 4 for pivotally carrying the trunnions 5 of the jaws 6. These jaws 6 differ from the jaws of the common spring trap in that they are alike at both ends and thus become reversible, which may be desirable in the event of excessive wear at the end which cooperates with other working parts of the trap.

The game engaging edges of these jaws are preferably flanged, as at 7, to increase the frictional area with the animal being caught and lessen the liability of severing the member.

Figure 1:
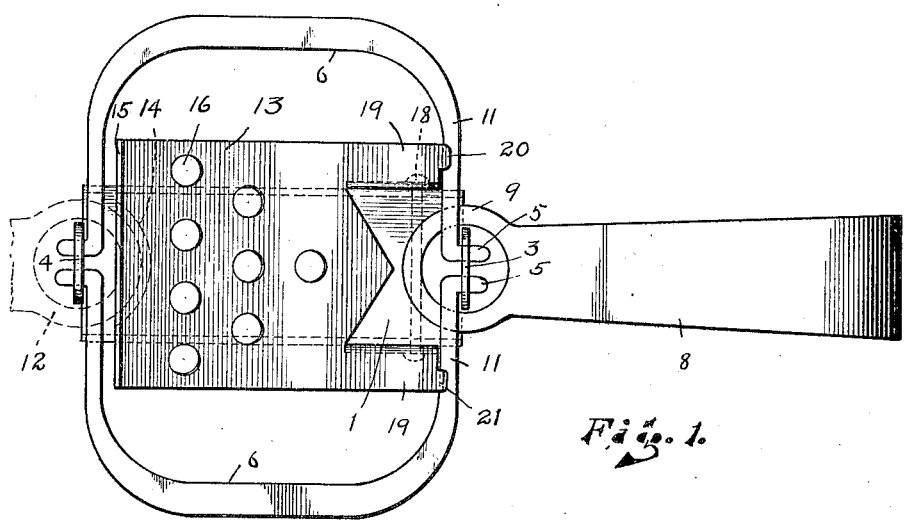
Figure 1 is a plan view of the improved trap as it appears set.

8 represents the spring of the trap which is of the usual U-shape type and forming the handle of the trap, its free ends 9 and 10 surrounding the upwardly bent end of the ear 3 of the base 1, that is when the trap is open, but when sprung the free end 9 of the spring is, by its expansive action, spaced from the opposite end encircling the shanks 11 of the jaws 6. The jaws 6 being as before stated, alike at both ends, will permit, if desired, of a second spring 8 being attached to the opposite side of the trap, as illustrated in dotted lines at 12 in Figure 1, when a stronger trap is desired, and in which event a flat arcuately shaped portion of the extreme free end of the pan 13 would have to be cut-away, as indicated at 14, so as to permit of the loop of the spring passing same.

The pan 13 of the trap I prefer to make of general rectangular form and covering a much larger portion of the area intermediate of the jaws than is customary in the ordinary spring trap. The extreme free end of the pan is turned up or ribbed as at 15, the same being for the purpose of providing a convenient hold for the claws of a water frequenting animal, such as a muskrat, or the like, which frequently have air holes for example through the ice where a trap is frequently set hanging downwardly at an incline under the water at the edge of the air hole. In such holes it is frequently found that the animals by constant use have formed narrow ledges about the edges of the hole to which they hang when coming for breathing purposes, and when one of these traps is thus suspended in the hole it is found that the animal will reach up and attempt to hang on the edge of the pan, when he will be caught. The holes 16 in the pan are also provided for like purposes for convenient engagement with the claws of an animal thus climbing into the trap, or, when the trap is set resting upon the bottom in shallow water, and an animal swimming over same will unintentionally claw the surface of the pan when it being thus roughened or provided with one or more ribs will be sufficiently engaged to spring same.

The pivotal mounting of the pan at the end opposite to the rib 15 just described is accomplished as follows:

Two triangularly shaped supporting brackets 17 are pressed downwardly out of the pan material at right angles thereto and so spaced that they fit just snugly outside of the downwardly flanged sides of the base 1 of the trap and at this union they are provided with a through bolt or rivet 18, which pivotally supports the pan, and which may be conveniently tightened or loosened to regulate the frictional engagement of same.

Figure 2:
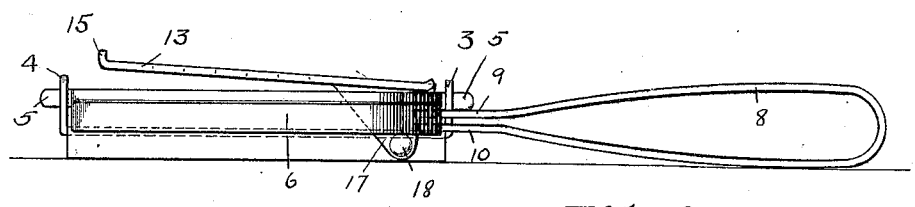
Figure 2 is a side elevation of same.
Figure 3:
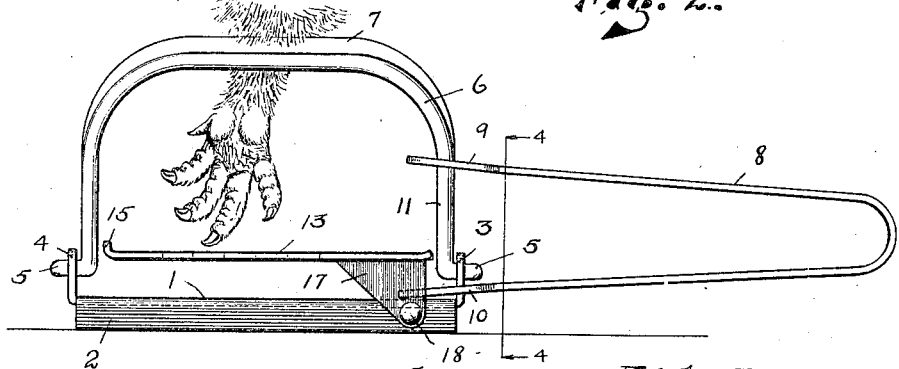
Figure 3 is a side elevation of the trap as it appears sprung.
Figure 4:
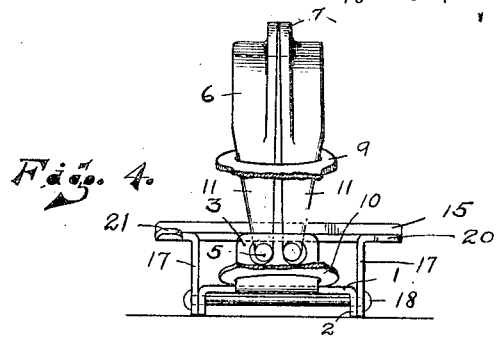
Figure 4 is a section taken on the line 4—4, Figure 3, towards the sprung jaws of the trap.

By the turning downwardly of the supporting members or brackets 17, narrow side continuations 19 are formed, upon the extreme end of which are reduced projecting ears 20 and 21. These ears are for overlapping engagement with the shanks 11 of the jaws of the trap when the latter are open and the pan is raised in set position, as shown in Figure 2. It will be noted that the ear 21 is arched slightly upwardly so that it does not have as positive engagement with its respective jaw as the ear 20, but still prevents the jaw which is engaged by the ear 21 from possible closing or getting out of alignment with the opposite jaw, as it is considered very material in my improved form of trap that the jaws are both permanently held open so that the trap may be set in as nearly flat position as possible. Another object of having but one loosely held in this position is to obviate the possibility of one jaw being sprung prior to the other, which might be the case if both of them were held more positively by the pan.

It is to be understood that various modifications in the details here illustrated, as for instance the shape of the pan etcetera, may be resorted to without departing from the spirit of the invention.

Having thus described my invention, what I claim and desire to secure by Letters Patent, is

1. The combination with a trap of the character described having a pair of pivotally mounted pinching jaws, and a U-shaped expansive spring for controlling the action of said jaws, of a base for said trap comprising a single piece of rectangularly shaped metal having its opposite side edges turned downwardly forming side walls longitudinally thereof, upwardly turned lugs at the opposite ends of the base and centrally thereof forming pivotal supports for the jaws of the trap, and a trip pan for said trap having downwardly turned brackets at one end thereof straddling the base of the trap and pivotally mounted in the sides thereof, and ears projecting from the trip pan adjacent said brackets for engagement with the jaws of the trap when holding same open.

2. The combination with a trap of the character described having a pair of pivotally mounted pinching jaws, and a U-shaped expansive spring for controlling the action of said jaws, of a base for said trap comprising a single piece of rectangularly shaped metal having its opposite side edges turned downwardly forming side walls longitudinally thereof, upwardly turned lugs at the opposite ends of the base and centrally thereof forming pivotal supports for the jaws of the trap, and a trip pan for said trap having downwardly turned brackets at one end thereof straddling the base of the trap and pivotally mounted in the sides thereof, ears projecting from the trip pan adjacent said brackets for engagement with the jaws of the trap when holding same open, and an upwardly extending rib transverse the free end of the pan for the purpose described.

3. The combination with a trap of the character described having a pair of pivotally mounted pinching jaws, and a U-shaped expansive spring for controlling the action of said jaws, of a base for said trap comprising a single piece of rectangularly shaped metal having its opposite side edges turned downwardly forming side walls longitudinally thereof, upwardly turned lugs at the opposite ends of the base and centrally thereof forming pivotal supports for the jaws of the trap, and a trip pan, having claw engaging holes therein, for said trap having downwardly turned brackets at one end thereof straddling the base of the trap and pivotally mounted in the sides thereof, and ears projecting from the trip pan adjacent said brackets for engagement with the jaws of the trap when holding same open.

4. The combination with a trap of the character described having a pair of pivotally mounted pinching jaws, a U-shaped expansive spring for controlling the action of said jaws, and a base upon which the jaws are mounted, of a trip pan pivotally mounted to said base, said pan having a plurality of claw engaging holes therein, and an upstanding claw engaging rib upon the free end thereof for the purpose described.

In testimony whereof I hereunto affix my signature in the presence of two witnesses.

NILS M. ROSENDAHL.

Witnesses:
S. C. BRONSON,
S. GEO. STEVENS.